US 6,633,924 B1

(12) United States Patent
Wu et al.

(10) Patent No.: US 6,633,924 B1
(45) Date of Patent: Oct. 14, 2003

(54) OBJECT SYNCHRONIZATION BETWEEN OBJECTS STORES ON DIFFERENT COMPUTERS

(76) Inventors: Charles Wu, 805 172nd Ave. NE., Bellevue, WA (US) 98008; George T. Hu, 14116 NE. 85th Ct., Redmond, WA (US) 98052; Jeffrey R. Blum, 231 Belmont Ave. E. #203, Seattle, WA (US) 98102

(*) Notice: Subject to any disclaimer, the term of this patent is extended or adjusted under 35 U.S.C. 154(b) by 0 days.

(21) Appl. No.: 08/944,948

(22) Filed: Oct. 2, 1997

(51) Int. Cl.[7] ................................................. G06F 9/00
(52) U.S. Cl. ........................ 709/328; 707/203; 709/203
(58) Field of Search ................................. 709/315, 316, 709/310, 328, 219, 217, 204, 203; 707/203, 511

(56) References Cited

U.S. PATENT DOCUMENTS

| | | | | |
|---|---|---|---|---|
| 4,965,718 A | | 10/1990 | George et al. | |
| 5,297,144 A | | 3/1994 | Gilbert et al. | |
| 5,333,299 A | | 7/1994 | Koval et al. | |
| 5,408,470 A | * | 4/1995 | Rothrock et al. | 370/261 |
| 5,493,676 A | | 2/1996 | Amundson | |
| 5,604,855 A | * | 2/1997 | Crawford | 345/473 |
| 5,684,984 A | * | 11/1997 | Jones et al. | 707/10 |
| 5,684,990 A | * | 11/1997 | Boothby | 707/203 |
| 5,701,423 A | * | 12/1997 | Crozier | 345/762 |
| 5,706,509 A | * | 1/1998 | Man-Hak Tso | 707/201 |
| 5,734,642 A | | 3/1998 | Vaishnavi et al. | |
| 5,758,355 A | | 5/1998 | Buchanan | |
| 5,845,293 A | * | 12/1998 | Veghte et al. | 707/202 |
| 5,884,323 A | * | 3/1999 | Hawkins et al. | 707/201 |
| 5,897,640 A | * | 4/1999 | Veghte et al. | 707/202 |
| 5,928,329 A | * | 7/1999 | Clark et al. | 709/227 |
| 5,974,238 A | * | 10/1999 | Chase, Jr. | 709/248 |
| 6,000,000 A | * | 12/1999 | Hawkins et al. | 707/201 |
| 6,006,274 A | * | 12/1999 | Hawkins et al. | 709/248 |
| 6,044,381 A | * | 3/2000 | Boothby et al. | 707/201 |
| 6,081,806 A | * | 6/2000 | Chang et al. | 707/8 |
| 6,128,661 A | * | 10/2000 | Flanagin et al. | 709/227 |
| 6,295,541 B1 | * | 9/2001 | Bodnar et al. | 707/203 |
| 6,317,797 B2 | * | 11/2001 | Clark et al. | 710/5 |
| 6,330,568 B1 | * | 12/2001 | Boothby et al. | 707/201 |
| 6,330,618 B1 | * | 12/2001 | Hawkins et al. | 709/248 |
| 6,401,112 B1 | * | 6/2002 | Boyer et al. | 709/206 |
| 6,442,570 B1 | * | 8/2002 | Wu | 707/201 |

OTHER PUBLICATIONS

Moss, B et al. "Design of the MNEME Persistent Object Store" ACM Transactions on Information Systems. Apr. 1990, pp. 103–139.*

* cited by examiner

Primary Examiner—Alvin Oberley
Assistant Examiner—Lewis A. Bullock, Jr.
(74) Attorney, Agent, or Firm—Lee & Hayes, PLLC

(57) ABSTRACT

The invention includes a method of synchronizing objects between first and second object stores. A synchronization manager in accordance with the invention maintains a reference store containing identifying data segments corresponding respectively to a plurality of objects that have previously been synchronized between the first and second object stores. An application program that maintains the first object store has associated interfaces that allow the synchronization manager to compare and manipulate objects. One such interface allows the synchronization manager to submit an identifying data segment associated with a particular object. In response, this interface returns a handle that corresponds to the submitted identifying data segment. Another interface accepts a handle that refers to an identifying data segment, and determines if the object corresponding to the identifying data segment has been changed in the first object store since the last synchronization. If it has, the synchronization manager takes steps to update the second object store. If, on the other hand, the object has changed in the second object store, application program interfaces allow the synchronization manager to update the object in the first object store. Objects are transferred through the synchronization manager in an arbitrary, application-specific format that is not determined or understood by the synchronization manager itself.

18 Claims, 5 Drawing Sheets

OBJECT SYNCHRONIZATION BETWEEN OBJECTS STORES ON DIFFERENT COMPUTERS

TECHNICAL FIELD

This invention relates to methods of synchronizing any form of data such as databases used in personal information managers, especially when the databases are used on two different computers that are only occasionally connected for data communications.

BACKGROUND OF THE INVENTION

As electronic components have continued to become smaller and less expensive, laptop, handheld, and other portable computers have become more and more popular. Although a variety of applications can be used with such computers, personal information managers (PIMs) form an important category of application programs that are particularly suited for used with portable computers or other portable information devices.

To get the most benefit from a PIM on a portable device, it is very useful if the PIM information can be kept up to date with a PIM that a user uses in conjunction with his or her desktop computer. Many portable computers are designed to connect with a desktop and to exchange information. When compatible PIMs are used on a portable computer and a desktop computer, it is possible to use this connectivity to update the PIMs so that the latest updates made by a user on one PIM are also reflected in the other PIM. This is referred to as "synchronization."

There are many competing desktop PIM applications on the market today. Each of them uses very different data formats. It is imperatively important for a portable device to be able to synchronize its data with each of these PIM applications. This requires a flexible and extensible architecture such that a synchronization software module can be easily written for a particular PIM application.

In contrast to previous methods of synchronizing PIMs, the inventors have developed a versatile system that allows a PIM on a portable computer to be synchronized with a great variety of desktop PIMs. An important advantage of the invention is that neither PIM component is required to track changes. Rather, this is taken care of by software components that are independent of the PIMs. These independent components can be used in conjunction with a number of different PIMs or similar database programs. Another important advantage of the invention is that it makes no assumption on the format of the data that are transferred between two computers. Therefore, the developer of a synchronization module has the total freedom of using different format of data depending only on specifics of the particular PIM application.

SUMMARY OF THE INVENTION

In accordance with the invention, a synchronization manager executes on a primary computer. The synchronization manager maintains a reference store and communicates with an auxiliary computer. Respective PIMs or other database management programs run on each computer. An object store is maintained on each computer.

Two additional components (usually in the form of DLLs) are used. A first interface component is associated with the PIM that executes on the primary computer. A second interface component is associated with the PIM that executes on the auxiliary computer. Each component exposes a defined set of interface methods.

On the primary computer, identifying data segments are maintained persistently in the reference store for each object in the primary computer's object store. The data segments are defined by the developer of the interface components-the synchronization manager has no knowledge of the type of data stored in these segments. The identifying data segments are derived from the objects, so that comparing a stored identifying data segment with a currently derived data segment results in an indication of whether the corresponding object has been changed since it was last synchronized. Such comparisons are performed by the interface components, rather than by the synchronization manager.

In the exemplary implementation of the invention, the identifying data segments include data representing any properties provided by the auxiliary computer's object store that are not supported in the primary computer's object store. This allows such properties to be recovered from the primary computer if they are lost from the auxiliary object store.

Objects stored in the object store maintained by the auxiliary computer also have identifiers. These identifiers are usually different from the identifying data segments used in the primary object store. A mapping is maintained by the synchronization manager so that when an object is changed in one store, the corresponding object in another store can be located and the same change can be applied to that object. Each time a new object in the primary store is created and synchronized to the auxiliary store, the synchronization manager retrieves the identifier for that new object in the auxiliary object store and uses it to establish a mapping between these two objects. All these mappings are stored in synchronization manager's reference store, along with the identifying data segments.

Whenever an object needs to be transferred from one store to another, the synchronization manager calls interface methods exposed by the interface components. These methods convert an object into a series of bytes. The synchronization manager then transfers these bytes to the other store and by calling an interface method that converts the bytes back to an object.

DETAILED DESCRIPTION

General Architecture

Figure 1:
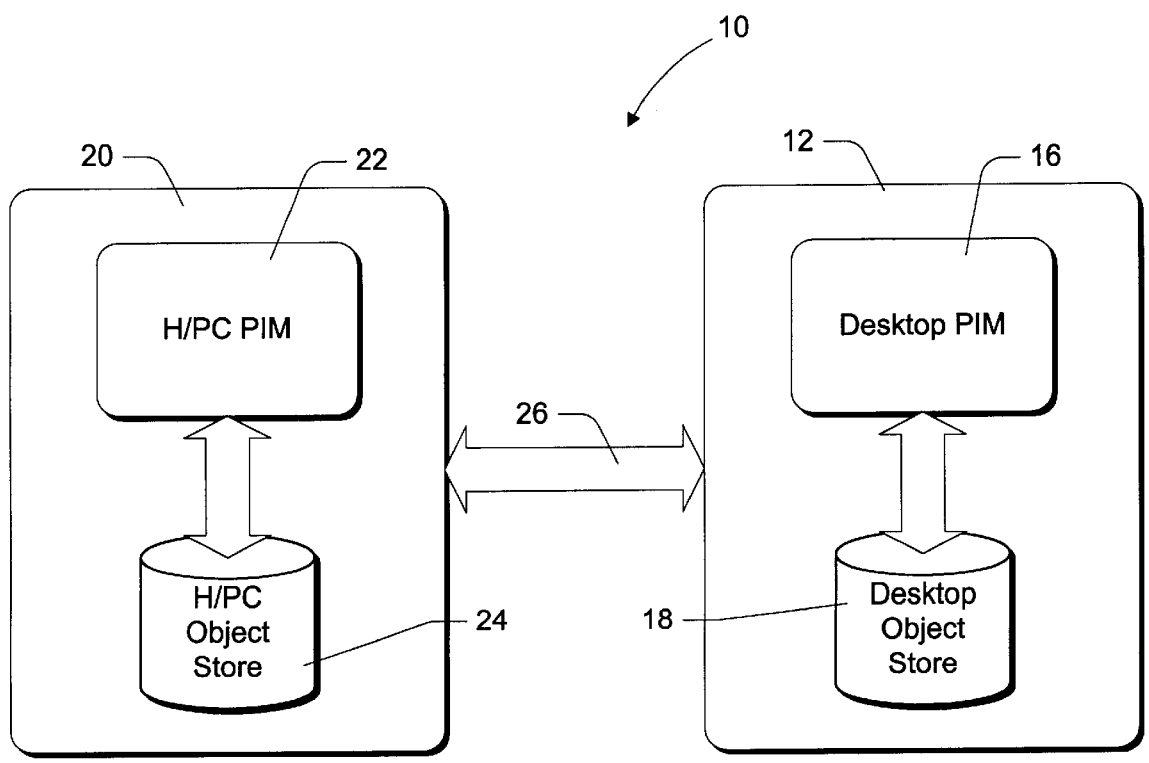
FIG. 1 is a block diagram of a system in accordance with the invention for synchronizing two object stores.

FIG. 1 shows a system 10 for synchronizing objects between first and second object stores. The system comprises a primary computer 12 and a portable computer or information device 20. An application program 16 executes on the primary computer to maintain a first or primary object store 18 on the primary computer. The application program is a personal information manager (PIM) or contact database program in the exemplary embodiment of the invention, although other database programs and various applications might also be configured to take advantage of the synchronization architecture described herein.

The Schedule+ program, available from Microsoft Corporation of Redmond, Wash., is one example of a PIM that can be configured in accordance with the invention. Microsoft Outlook 97 is another example. The primary object store, also referred to as a desktop object store, is configured to store a plurality of individual records or objects, each comprising a plurality of fields or properties. In Schedule+, for example, there are objects of different types, corresponding to appointments, contacts, and tasks. Each object comprises a plurality of properties, such as addresses, phone numbers, task descriptions, etc.

Portable information device 20 is implemented as a handheld personal computer (H/PC). H/PC 20 executes an application program 22 that maintains a second or auxiliary object store 24, also referred to as the H/PC object store. The application program in the exemplary embodiment of the invention is a general-purpose PIM.

The auxiliary object store similarly stores a plurality of objects, each comprising a plurality of properties. The objects are intended to be synchronized with the objects in primary store 18. Conceptually, any particular object exists in both H/PC object store 24 and desktop object store 18. Actually, however, there are two instances of the same object. When a user modifies one instance of an object, the other instance needs to also be modified so that the instances eventually contain identical data. This is referred to as synchronization, and is preferably accomplished without significant user effort.

In some situations, the H/PC object store has objects that include properties not supported by the desktop object store. As an example, a "contact" object in the H/PC object store includes a "home fax number" property that is not supported by Schedule+. Special steps are taken in accordance with the invention to accommodate this situation.

Synchronization managers run on both computers, communicating with the application programs on both computers through well defined interfaces to manage communications and synchronization. The synchronization managers of the two computers communicate with each other via an available communications medium 26 such as a physical cable or connection using a serial communications protocol. IR (infrared) communications can alternatively be used. Such communications capabilities are -commonly available in desktop and portable computers.

Figure 2:
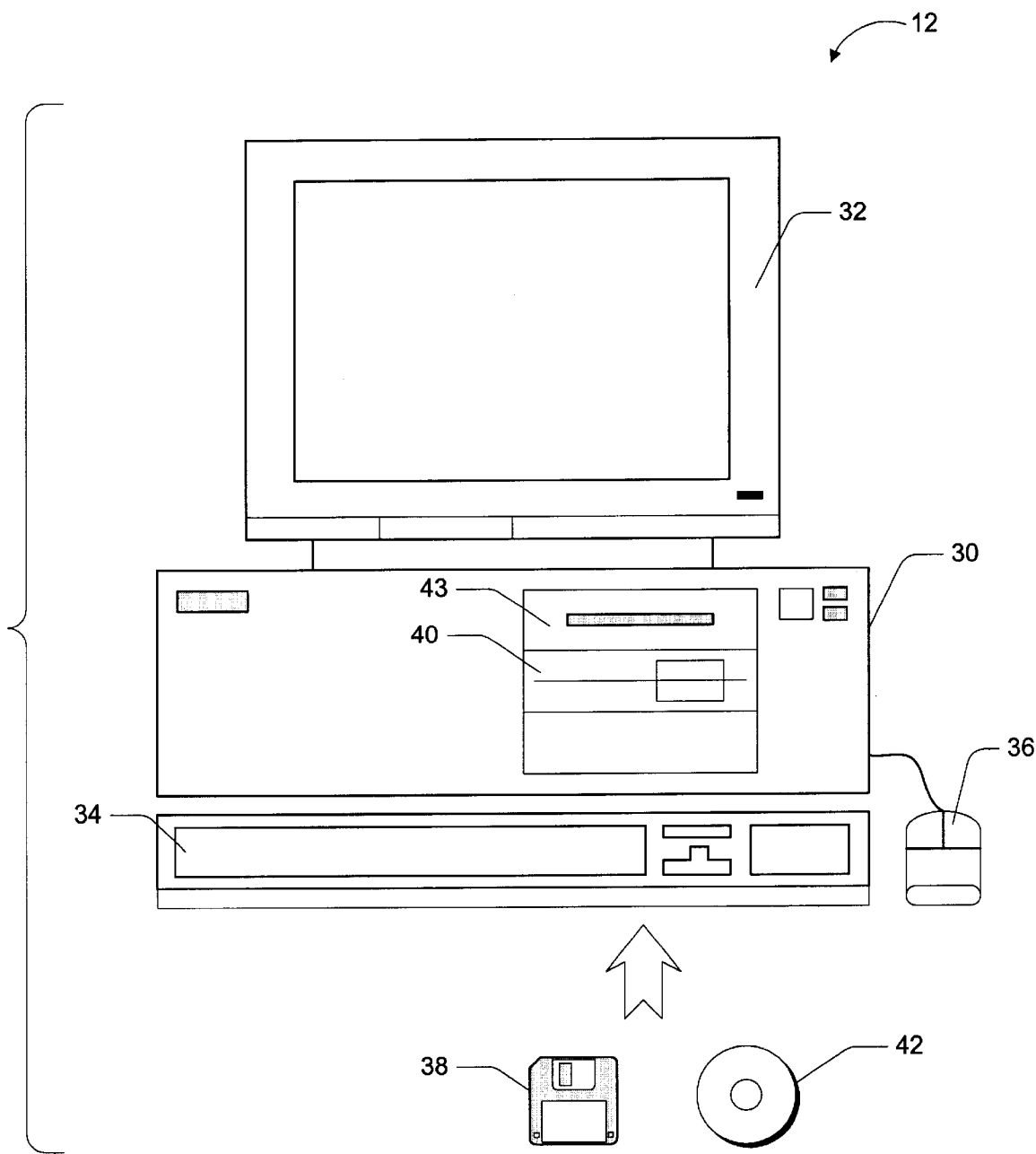
FIG. 2 shows a primary desktop computer such as used in conjunction with the invention.

FIG. 2 shows primary computer 12 as a conventional desktop computer. Desktop computer 12 in the illustrated embodiment is a conventional IBM-compatible computer having a central processing unit (CPU) 30, a display monitor 32, a keyboard 34, and a mouse 36. The computer 12 also utilizes a computer-readable storage medium such as a floppy memory diskette 38 in conjunction with a floppy disk drive 40. Computer 12 utilizes a further computer-readable storage medium in the form of an optical storage medium 42, such as a CD-ROM or DVD, in conjunction with a CD-reader or access device 43. Computer 12 might also include another input device in addition to, or in lieu of, the keyboard 34 and mouse 36 including such devices as a track ball, stylus, or the like.

Figure 3:
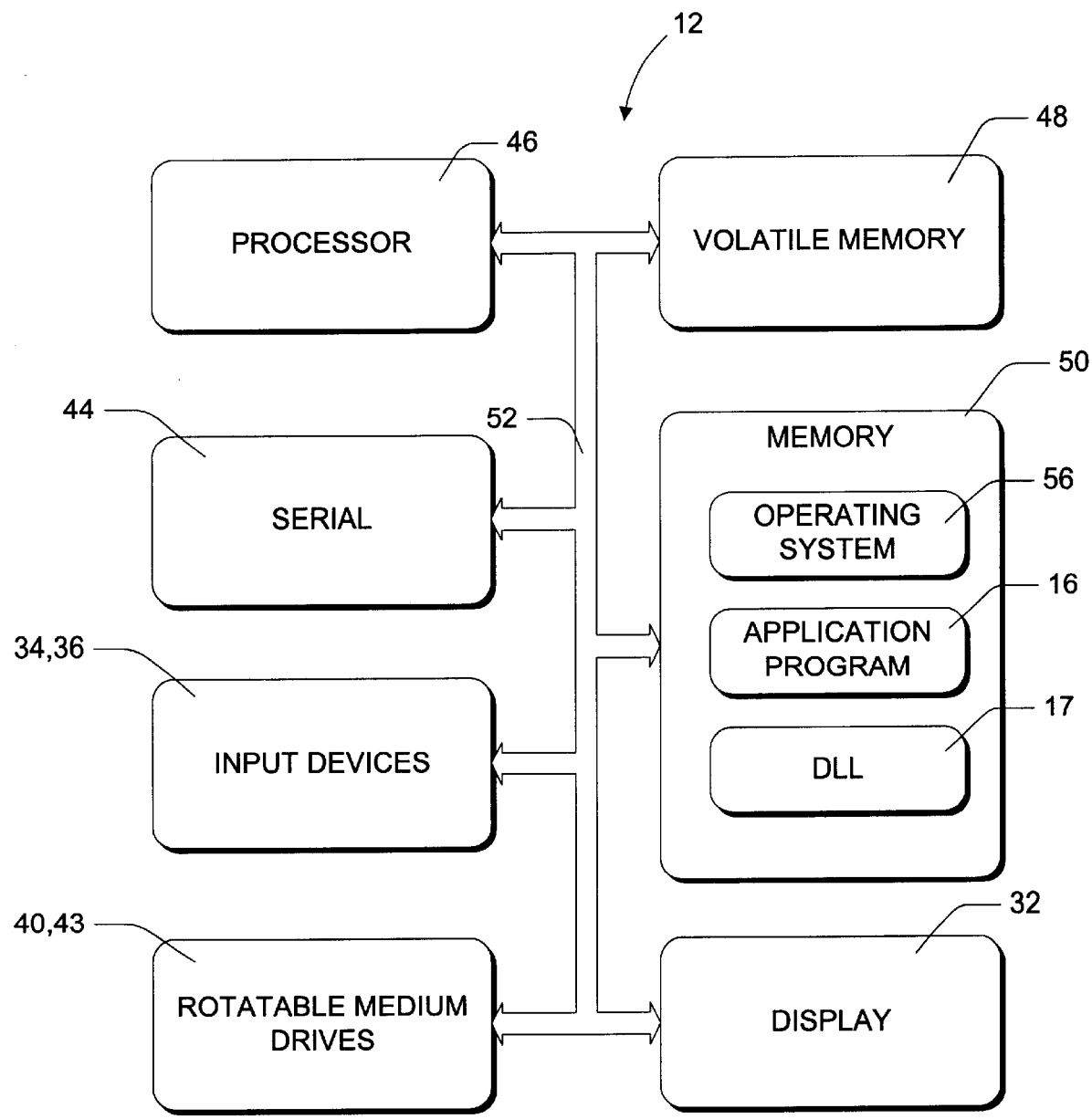
FIG. 3 is a simplified block diagram of the desktop computer of FIG. 2.

FIG. 3 shows a functional block diagram of computer 12. Computer 12 has a processor 46 and one or more forms of computer-readable storage media. Specifically, computer 12 includes a volatile memory 48 (e.g., RAM), and a non-volatile memory 50 interconnected by an internal bus 52. The non-volatile memory 50 can be implemented as integrated circuit chips (e.g., ROM, EEPROM), disk drive(s) (e.g., floppy, optical, hard), or a combination of both.

The display 32 is connected to the bus 52 through appropriate hardware interface drivers (not shown). Additionally, the input devices 34,36 are connected to supply data to the bus 52 via appropriate I/O ports. Floppy drive 40 and access device 43 are also connected through bus 52. Computer 12 includes a serial communications port 44 for communicating with portable information device 20. The serial communications port is connected for communications with processor 46 through bus 52.

The computer 12 runs an operating system 56 that is stored on the non-volatile memory 50 and executes on the processor 46. One preferred operating system is a Windows brand operating system sold by Microsoft Corporation, such as Windows 95 or Windows NT or other derivative versions of Windows. However, other operating systems may be employed, such as the Macintosh OS from Apple Corporation and the OS/2 Presentation Manager from IBM.

Application program 16 is stored in memory 48 or 50. An application such as Schedule+ can be loaded into memory 48 or 50 from the floppy diskette 38 or CD-ROM 42, or alternatively, downloaded from a network via a network port (not shown). A dynamically linked library 17, comprising a plurality of executable functions, is associated with application program 16 for execution by processor 46.

Inter-process and inter-program calls are facilitated by using the component object model (COM) as is common in programs written for Microsoft Windows operating systems. When using COM, a software component such as the DLL mentioned above has a number of interfaces. Each interface exposes a plurality of methods, which can be called individually to utilize different services offered by the software component. In this document, the term "interface" is used somewhat more generically to indicate one or more software components, methods, or functions that can be called by some other software component, and that can optionally receive and return one or more parameter arguments. When first and second interfaces are described, for example, this could refer to two methods that are grouped together under the heading of a single COM interface.

Generally, the DLL associated with a particular application program is designed specifically to work in conjunction with that application program and to expose desktop synchronization interfaces that function as described below. Specifically, the DLL has a plurality of specifically defined interfaces that can be called by other programs or processes executing on computer 12. The DLL, in turn, is able to call interfaces exposed by application program 16, in order to access data representing individual properties of objects maintained by the application program. If the system includes a plurality of application programs that are to participate in synchronization, there is a DLL for each application program. Each DLL exposes the same set of interfaces. The applications themselves typically have widely different interfaces to which the DLLs must adapt.

Figure 4:
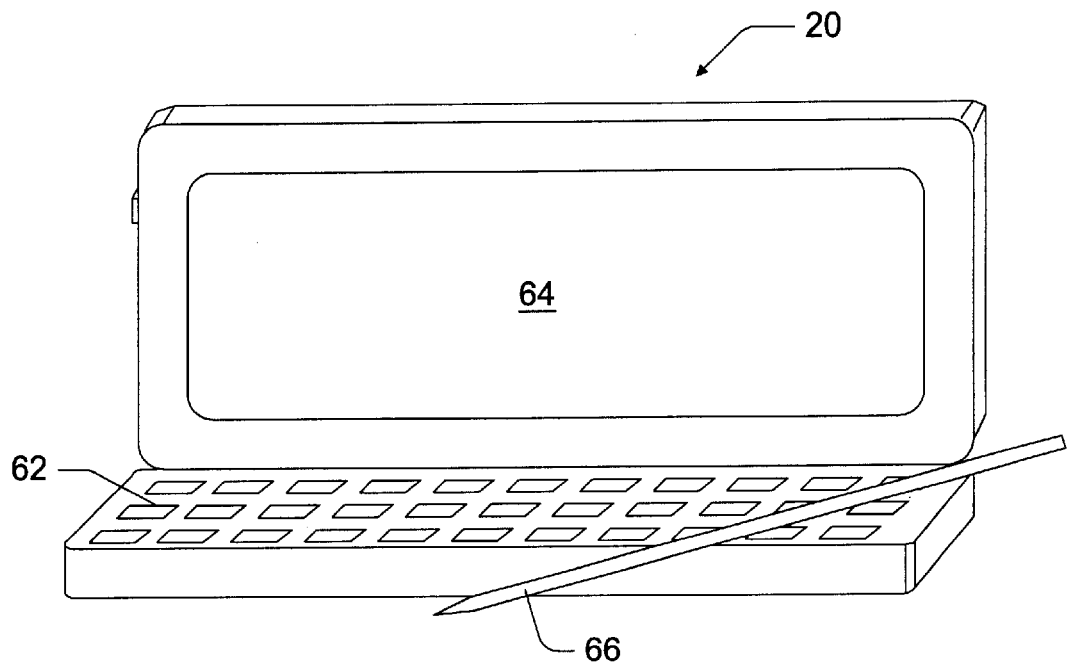
FIG. 4 shows an auxiliary, portable computer such as used in conjunction with the invention.

FIG. 4 shows a portable information device or handheld personal computer (H/PC) 20 such as might be used in conjunction with the invention. For purposes of this description, the term "portable information device" means a small computing device having a processing unit that is capable of running one or more application programs, a display, and an input mechanism that is typically something other than a full-size keyboard. The input mechanism might be a keypad, a touch-sensitive screen, a track ball, a touch-sensitive pad, a miniaturized QWERTY keyboard, or the like. In other implementations, the portable information device may be implemented as a personal digital assistant (PDA), a personal organizer, a palmtop computer, a computerized notepad, or the like.

H/PC 20 has components similar to those of desktop computer 12, including a miniaturized keyboard 62 and a small LCD display 64. Instead of a mouse, H/PC 20 uses a touch-sensitive display screen in conjunction with a stylus 66. The stylus is used to press the display at designated coordinates for user input.

Figure 5:
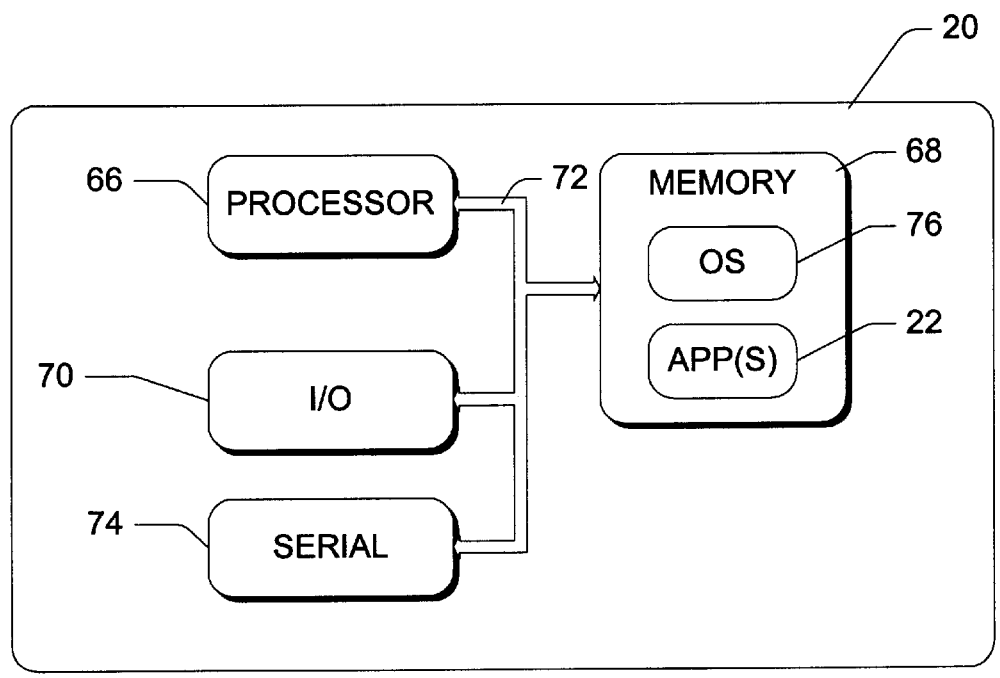
FIG. 5 is a simplified block diagram of the portable computer of FIG. 4.

FIG. 5 shows pertinent functional components of H/PC 20. It has a processor 66, memory 68, and I/O components 70 (including the display and keyboard). These components communicate over a bus 72. A serial interface 74 is available for communications with desktop computer 12. In current H/PCs, memory 68 is non-volatile electronic memory such as battery-backed RAM (random access memory). Part of this memory is allocated as addressable memory for program execution, and the remaining part is used to simulate disk storage.

An operating system 76 is loaded in and executes on processor 66 from memory 68 of H/PC 20. H/PC 20 preferably runs the Windows CE operating system from Microsoft Corporation. This operating system is a derivative of Windows brand operating systems, such as Windows 95, that is especially designed for handheld computing devices. Windows CE implements database features that can be utilized by application programs through exposed application programming interfaces and methods. These interfaces are described in an Appendix A which forms part of this document. Second object store 24 (FIG. 1) is maintained by the operating system, at least partially in response to calls to these interfaces from application programs such as PIMs.

Application program 22 executes from memory 68 of H/PC 20. The application program in one embodiment is a PIM that utilizes the database features of the Windows CE operating system to store objects and their properties. This application program is not necessarily designed to be compatible with the PIM that executes on the desktop computer. Specifically, there may not be a one-to-one matching between the properties of specific object types. Some properties in the H/PC PIM may have no corresponding properties in the desktop PIM. Furthermore, neither PIM is necessarily designed with synchronization in mind.

Figure 6:
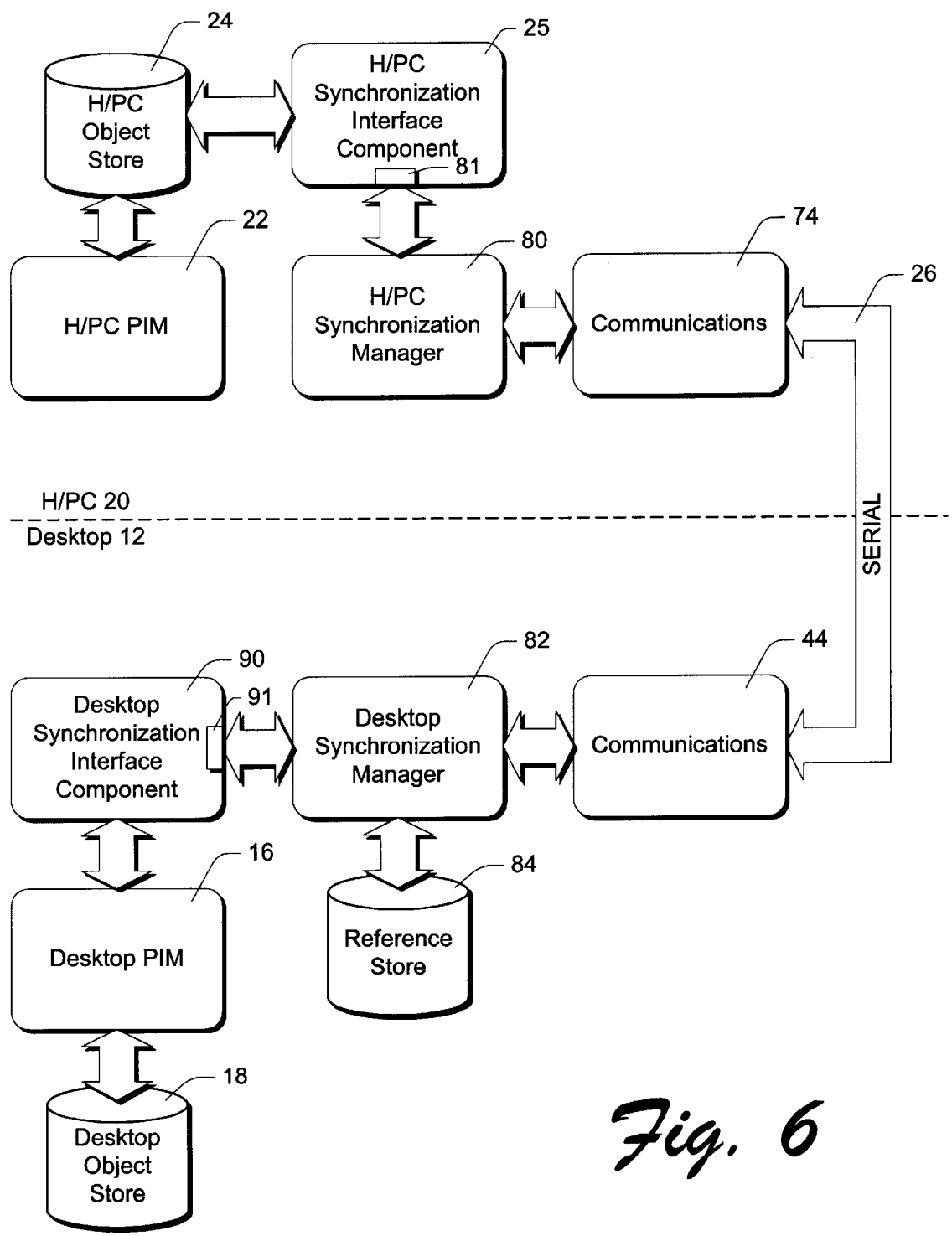
FIG. 6 is an architectural diagram of a system in accordance with the invention for synchronizing object stores maintained on two different computers.

FIG. 6 shows pertinent architectural components of both H/PC 20 and desktop computer 12 that are used to synchronize objects between desktop object store 18 and the H/PC object store 24. As discussed above, a PIM 22 executes on H/PC 20. A block 80 represents an H/PC synchronization manager, which communicates with a synchronization interface component 25. This component communicates with the H/PC PIM application and/or H/PC object store 24. The synchronization interface component exposes application programming interfaces that H/PC synchronization manager 80 calls to read and store objects and object properties. Generally, the interfaces allow the creation of databases for different types of objects, and allow application programs to write and read property names and values to and from respective objects within each database. The interfaces are described in Appendix A.

Although there is a great deal of flexibility allowed in storing objects and properties in H/PC object store 24, generally a PIM creates a distinct database for each different object type. For example, different databases are created for appointments and tasks, respectively. A predefined set of properties is supported for each object type. Each database is assigned a name by the application program that creates it. Alternatively, an application program might use a single database for all object types, with the first property for each object defining the type of the object. Objects are uniquely identified within H/PC 20 by object identifiers that are independent of the names assigned by the application programs creating the objects.

Desktop PIM 16 executes on desktop computer 12 and maintains desktop information store 18. A reference store and synchronization manager 82 (referred to below simply as a synchronization manager) also executes on desktop computer 12. This component is responsible for orchestrating synchronization between objects in the H/PC object store and the desktop object store. Synchronization manager 82 maintains a reference store 84, apart from desktop object store 18.

Synchronization manager 82 is not closely associated with desktop PIM 16. Rather, it is an independent component that synchronizes objects from any application program that supports the appropriate desktop synchronization interfaces described below and in Appendix B. A number of different application programs can be supported simultaneously by synchronization manager 82.

Communications components 74 and 44 are implemented on H/PC 20 and desktop computer 12, respectively. These components implement serial communications between the computers using a serial cable or an infrared link. H/PC synchronization manager 80 communicates with desktop synchronization manager 82 through these components.

Desktop Synchronization Interface Component

Desktop synchronization manager 82 communicates with desktop PIM 16 and accesses desktop object store 18 through a desktop synchronization interface component 90, which corresponds generally to DLL 17 of FIG. 3 and which exposes interface methods as described in Appendix B. The interfaces most pertinent to the invention are also described in the following general discussion.

The desktop synchronization interfaces are implemented specifically to work in conjunction with a particular desktop PIM. In general, providing synchronization for any particular database application requires only the development of a desktop synchronization interface component for the application. Because the interface methods are standardized, they allow synchronization manager 82 to access and synchronize any number of different desktop PIMs, as long as the required interface methods are implemented for each PIM.

In some cases, the interface methods might be implemented as part of the is desktop PIM. In many other cases, however, they will be designed as "add-ons" or supplemental DLLs, in order to allow synchronization with an application program where synchronization is not provided as an integral feature.

Generally, the desktop synchronization interfaces allow the desktop synchronization manager to compare corresponding objects in the desktop and H/PC object stores, to receive objects from the desktop object store, and to update objects in the desktop object store. By providing these relatively simple functions, the desktop PIM is relieved of the burden of performing actual synchronization.

Identifying Data Segments

The most basic function of reference store 84 is to provide a mapping between instances of objects stored in H/PC object store 24 and desktop object store 18, although it can also provide other functionality as will be described. Objects in H/PC object store 24 are identified by object identifiers. However, these same object identifiers are not used by desktop PIM 16 to identify corresponding object instances in desktop object store 18. In most cases, in fact, PIM 16 is completely unaware that H/PC object store 24 even exists. Accordingly, some type of mapping is required between instances of the same object in the two different object stores.

To identify particular objects in the desktop object store, the invention utilizes data items referred to herein as "identifying data segments." An identifying data item, generally, is some piece of data that can be used to identify a particular object. The exact composition of an identifying data segment is known only to the synchronization interface components, although identifying data segments are handled and stored by desktop synchronization manager 82. Thus, the developer of a desktop synchronization interface component is allowed to define the format of the identifying data segment. In most cases, an object identifier will be based at least in part on properties of the corresponding object.

Synchronization manager 82 maintains reference store 84 so that it contains identifying data segments corresponding respectively to a plurality of objects in desktop object store 18 that are to be synchronized with instances of the same objects in H/PC object store 24. In most cases, the identifying data segments in the reference store correspond to objects that have previously been synchronized between the two object stores. The identifying data segments are updated after their corresponding objects have been synchronized.

To reiterate, identifying data segments are defined solely by the synchronization interface components. Conceptually, an identifying data segment can be any collection of data that uniquely identifies a particular object in desktop object store 18. The synchronization manager never directly examines or changes the identifying data segments.

In actual implementation, the identifying data segments should be formatted in accordance with the following criteria so that the desktop synchronization interface component can perform its specified functions:

(a) Each identifying data segment should contain data that uniquely identifies an object-such as an object identifier, ID number, a full path name for a file system object, etc. This data must be persistent (never change for a particular object) and must not be reused for subsequently created objects. This data can be compared to determine whether two identifying data segments actually correspond to the same object.

(b) It must be possible to derive some object order based on the identifying data segment. This is required for efficient searching, as will be explained below.

(c) The identifying data must have some sort of time stamp information. Timestamp information can be compared to determine whether an object has changed since the last identifying data segment was recorded in reference store 84.

The identifying data segments are created by the desktop synchronization interface component and are provided to synchronization manager 82 by a desktop synchronization interface method named "ObjectToBytes". In addition to maintaining a plurality of identifying data segments, synchronization manager 82 also maintains a list of object identifiers corresponding to objects maintained in H/PC object store 24. These identifiers are provided to desktop synchronization manager 82 from H/PC synchronization manager 80 whenever a new object is added to H/PC object store 24. Desktop synchronization manager 82 also maintains a mapping or other indication of correspondence between the object identifiers and the identifying data segments (or the desktop objects to which the identifying data segments correspond).

Obtaining Handles To Objects

Most of the desktop synchronization interfaces are designed so that synchronization manager 82 can reference particular objects by using "handles." The term "handle" as used herein refers to a number or other identifier that can be used to uniquely identify an object and to access the object. Generally, a handle is valid only for a particular time period or session, such as during the time when an object has been "opened." If the same object is opened again, its handle may be different.

Note that the handles used by desktop synchronization interface component 90 do not necessarily correspond to any sort of identifiers used by desktop PIM in desktop object store 18. However, synchronization manager 82 needs to obtain a list of handles corresponding to the objects stored in desktop object store 18 before it can perform any significant synchronization tasks. These handles are provided by the exposed methods of desktop synchronization interface component 90. After obtaining handles, synchronization manager 82 determines a correspondence between the provided handles and object identifiers used by H/PC PIM 22, with reference to reference store 84.

Upon initialization, synchronization manager 82 constructs two lists of handles. The first list is obtained by submitting identifying data segments (previously stored in reference store 84) to a desktop synchronization interface named "BytesToObject." This interface stores a submitted data segment and returns a handle corresponding to the data. Synchronization manager 82 receives the handle and adds it to its first list. Synchronization manager 82 repeats this procedure for each identifying data segment in reference store 84, receiving a handle to each such data segment. The handles correspond respectively to objects belonging to a first group of objects that have been synchronized in the past.

The second list of handles is obtained by querying desktop synchronization interfaces named "FindFirstItem" and "FindNextItem." When successively called, these interfaces enumerate an ordered list of handles corresponding respectively to a second group of objects-those objects currently in desktop object store 18. This group of objects potentially includes at least some of the first group of objects. In fact, this second group of objects will include all objects of the first group except for those objects that have been deleted from the desktop object store since the last synchronization. The enumerated order of the handles is determined by the data in the identifying data segment.

Once the desktop synchronization manager has two lists of handles, it proceeds to match any handles of the first and second lists that correspond to the same object. It does this by repeatedly querying desktop synchronization interface "CompareItem" with pairs of handles from the first and second lists. The interface receives the two handles and returns and indication of whether the two handles correspond to the same object. In addition, for handles that do not correspond to the same object, the interface returns an indication of whether the handle from the first list falls before or after the handle from the second list, relative to the order in which handles were previously enumerated by the FindFIrstItem and FindNextItem interfaces. This allows synchronization manager 82 to implement a more efficient search algorithm as it attempt to find matching handles in the second list for all handles in the first list. However, the synchronization manager is not required to have any understanding of the contents of the identifying data segments—it just submits them to the desktop synchronization interface component for comparison.

CompareItem depends on the inclusion in the identifying data segments of some type of persistent identifier that uniquely identifies an object, and further data that can be used to derive a consistent object order based on the identifying data segments. To determine whether two identifying data segments correspond to the same object, the interface compares the unique identifying data from each data segment. If this test fails, the interface examines a portion of the data segment that s used to derive an object order. This portion of the data segment might comprise a time stamp or some other sequence indication.

Based in the comparison results, desktop synchronization manager 82 constructs and maintains a mapping between handles and object identifiers that are used in H/PC object store. These mappings are derived from mappings maintained between I/PC object identifiers and the identifying data segments maintained in reference store 84. When the synchronization manager receives an object identifier corresponding to a modified object in H/PC synchronization manager 80, the synchronization manager references the mappings with the received object identifier to identify which handle corresponds to the same object in the desktop object store.

Detecting Changes to the Desktop Object Store

If there is a particular handle in the first list that does not have a matching handle from the second list, the desktop synchronization manager concludes that the object corresponding to the particular handle has been deleted from the desktop object store since the last synchronization. Synchronization in this case requires deleting the object from the H/PC object store. On the other hand, if there is a particular handle in the second list that does not have a matching handle from the first list, the synchronization manager concludes that the object corresponding to the particular handle has been added to the desktop object store since the last synchronization. Synchronization in this case requires adding the object to the H/PC object store.

The steps described above allow desktop synchronization manager 82 to determine whether objects have been added to or deleted from the desktop object store since the last synchronization with H/PC object store 24. In addition, however, synchronization manager 82 must determine whether an object has been modified in the desktop object store. This determination is made by querying synchronization interface "IsItemChanged" with matching handles from the first and second lists. The interface compares the identifying data segment associated with each handle to determine whether the object in the desktop object store has been changed since its identifying data segment was written to the reference store. This is possible because the identifying data segment, as noted above, includes time stamp information or some similar information such as a sequence or revision number. If the timestamp information is not identical, there has been a change to the object.

Note that none of these procedures requires synchronization manager 82 to be aware of the particular nature or format of the identifying data segments or of the objects to which they correspond. Rather, interface component 90 is called upon for all actions that depend upon the actual content of the identifying data segments. It is up to the designer of interfaces 90 to define a format for the identifying data segments that will allow the interfaces to perform their required functions.

Detecting changes to The H/PC Object Store

H/PC synchronization manager 80 is designed to maintain a status bit for each object in H/PC object store 24, indicating whether that object has been changed since the last synchronization. Whenever H/PC PIM 22 changes an object, this bit is set and the H/PC synchronization manager sends a notification to desktop synchronization manager 82 over whatever communications means are currently employed between the H/PC and the desktop computer. If there is no current communications capability, a log entry is generated so that notice of the change can be sent the next time communications are established. The status bit is reset when a return notification is received indicating that the object has been synchronized in the desktop object store.

Synchronizing Objects

Generally, there are three type of events that raise at least a potential need for synchronization:

(a) When the H/PC is first connected to the desktop computer or first establishes communications with the desktop computer.

(b) When an object is created or modified on the portable information devices while communications are established.

(c) When an object is created or modified on the desktop computer while communications are established.

When communications are first established between the H/PC and the desktop computer, there are potentially a number of modified, unsynchronized objects on the two computers. As noted above, H/PC synchronization manager 80 maintains a log of such changes. The log is provided to desktop synchronization manager 82 when communications are established. The log indicates object identifiers for the objects that have been modified, added, or deleted in the H/PC object store.

On the desktop computer, synchronization manager 82 is responsible for determining which objects have been changed in desktop object store 18. This is accomplished as described above by obtaining a list of handles representing identifying data segments stored in reference store 84 and another list of handles representing objects and corresponding identifying data segments as currently existing in desktop object store 18. The handles are matched and compared to determine whether objects have been added, deleted, or modified since the last synchronization.

The desktop synchronization manager constructs a list of objects that have been changed in the H/PC object store and another list of objects that have been changed in the desktop object store. If a particular object has been changed in the H/PC object store, the synchronization manager performs a step of updating the desktop object store with the changed object from the H/PC object store. If a particular object has been changed in the desktop object store, the synchronization manager performs a step of updating the H/PC object store with the changed object from the desktop object store.

In some cases, an object will have changed in both object stores. If so, the user is prompted to resolve the conflict by deciding which modification should be retained. In the exemplary embodiment of the invention, the H/PC instance of the object is retrieved by desktop synchronization manager 82 from H/PC synchronization manager 80 and used to create a new object in desktop object store 18. A handle to the new object is obtained, and synchronization interface "GetConflictInfo" is queried. This interface accepts handles to two objects and returns a conflict resolution text string that is to be used to prompt a user. The text string indicates information about the two objects, such as pertinent records or timestamp information. The synchronization manager uses this text to prompt a user to decide which of the two objects should be retained. If the H/PC version of the object is selected, it replaces the desktop version. If the desktop version is selected, it is sent to the H/PC synchronization manager to overwrite the existing version of the object in H/PC object store 24.

In other cases, object modifications will occur while communications are already established. In the exemplary embodiment of the invention, synchronization takes place continuously and transparently whenever communications are established. When a modification is made on the H/PC, H/PC synchronization manager 80 immediately sends a notification to desktop synchronization manager 82, which copies the modified object to desktop object store 18 (after checking for a conflict). On the desktop side, synchronization is scheduled at periodic intervals such as every five minutes, to simulate continuous synchronization. After each interval, desktop synchronization manager 82 calls synchronization interface component 90 to enumerate a current list of handles, representing current objects in object store 18. These are then compared to the handles corresponding to identifying data segments in reference store 84 to determine whether any changes have been made since the last synchronization.

In still other cases, desktop PIM 16 might be capable of providing an immediate notice to synchronization manager 82 when an object is modified in desktop object store 18. For instance, the PIM might allow synchronization manager 82 to register a callback function. If this is the case, changes in desktop object store 18 can be synchronized as they occur, rather than at periodic intervals.

Exchanging Objects

Desktop synchronization manager 82 is designed to treat objects as arbitrary data streams. The synchronization manager never examines objects themselves. Special interfaces are associated with both the H/PC PIM and the desktop PIM for exchanging objects. On the desktop, these interfaces are named "GetPacket" and "SetPacket". Interface "Setup" is used to specify a handle corresponding to an object that is to be obtained from desktop object store 18 by desktop synchronization manager 82. Once the object is specified by its handle, GetPacket is called repeatedly to retrieve a data stream representing the object. This data stream is formatted in a way that is known only to desktop synchronization interfaces 90 and to the corresponding interfaces exposed by H/PC interface component 25. SetPacket works similarly but inversely to GetPacket.

Similar interfaces are provided to work in conjunction with H/PC PIM 22. To send an object from desktop object store 18 to H/PC object store 24, desktop synchronization manager 82 calls the desktop GetPacket repeatedly to obtain a data stream representing the object. As the data stream is obtained, it is sent over the serial communications medium to H/PC synchronization manager 80. H/PC synchronization manager 80 calls the H/PC SetPacket interface, which receives the data stream and converts it into a format suitable for storage in H/PC object store 24. If the object is a new object, the object identifier assigned by H/PC synchronization manager 80 is returned to synchronization manager 82.

The reverse procedure is followed to send an object from H/PC 20 to desktop computer 12. When an object is modified in H/PC object store 24, desktop synchronization manager 82 requests the modified form of the object through communications component 88. It uses the object identifier for the object in conjunction with the mappings to determine which handle corresponds to the object in the desktop object store. It provides this handle and the modified form of the object to the desktop synchronization interface Setup, which in turn instructs desktop PIM 16 to replace the object corresponding to the identified handle with the modified object (or to add a new object if appropriate).

Updating Identifying Data Segments

Identifying data segments in reference store 84 are updated to reflect the current objects in desktop object store 18, but only after the object has been synchronized with the same object in H/PC object store 24. Updating is accomplished by providing a handle corresponding to a particular object in desktop object store 18 to a synchronization interface called "Updateitem." In response, the desktop synchronization interface component modifies the stored identifying data segment by updating its time stamp data. At a later time, the desktop synchronization manager calls interface ObjectToBytes to update the identifying data segment stored in the reference store.

Mapping Properties and Saving Unsupported Properties

Desktop synchronization interfaces 90 are responsible for mapping properties from H/PC object store 25 to corresponding properties in desktop object store 18. As described above, objects are sent to interface SetPacket as data streams. SetPacket parses the data stream, identifies particular property values, and stores at least some of the properties or property values as corresponding properties in an object of desktop object store 18. The correspondence between H/PC properties and desktop properties is determined by the designer of the desktop synchronization interface component 90. Actual storage of objects and properties in desktop object store 18 is accomplished by calling COM or other interfaces exposed by the particular desktop PIM 16.

In some cases, certain properties provided from H/PC object store 24 have no corresponding properties in desktop object store 18. Such properties are referred to herein as unsupported properties. In these cases, data representing the unsupported properties is returned to desktop synchronization manager 82 through the ObjectToBytes interface as part of the identifying data segments, without storing the properties in the desktop object store. The properties are thus stored in reference store 84 rather than desktop object store 18. Alternatively stated, the identifying data segment for a particular object includes data representing any object properties not supported by the desktop object store. Since ObjectToBytes is invoked after updating desktop object store 18 with an object from H/PC object store 24, there is always an opportunity to update the identifying data segments with currently synchronized data.

Before retrieving a particular object from desktop object store with GetPacket, synchronization manager 82 invokes the BytesToObject interface, submitting the object's handle and its identifying data segment (which includes data representing the unsupported properties). Subsequently, GetPacket returns the object, including the unsupported properties, and the object is in turn provided to H/PC synchronization manager 80 for storage in H/PC object store 24.

General Issues

The desktop synchronization manager is configured to detect or to be notified when a portable information device has been connected for synchronization. Such notification can be generated automatically, or the user can initiate the notification.

DLLs associated with particular PIM application programs are listed in the Windows registry of the desktop computer. When a portable information device is connected, it notifies the synchronization manager of database or PIM programs that wish to participate in synchronization. The desktop synchronization manager examines the Windows registry and loads any registered DLLs that are required to synchronize database or PIM programs executing on the desktop computer. The synchronization manager also examines the registry to determine what object types are available for each DLL.

In the exemplary embodiment, each object type is represented as a "folder." An initial step performed by synchronization manager 82 is to call appropriate interfaces to obtain handles to such folders. As described in Appendix B, folder handles are used for various management purposes.

CONCLUSION

The invention provides an extremely versatile way to synchronize desktop database application programs that might not have been originally designed with synchronization in mind. The invention allows for continuous synchronization of database objects, without any significant user effort, and in most cases without requiring modification of the database application programs. Rather, synchronization can be provided by implementing DLLs that execute in conjunction with the application programs. The DLL itself is not required to actually perform synchronization tasks, but rather is only required to perform specific data manipulations that are fairly straightforward in implementation.

Although the invention has been described in language specific to structural features and/or methodological steps, it is to be understood that the invention defined in the appended claims is not necessarily limited to the specific features or steps described. Rather, the specific features and steps are disclosed as exemplary forms of implementing the claimed invention.

What is claimed is:

1. A computer system comprising:
   a first object store containing a plurality of objects;
   an application program that maintains the first object store;
   application program interfaces associated with the application program;
   a synchronization manager that communicates with the application program through the application program interfaces to synchronize objects in the first object store relative to corresponding objects in a second object store that is not associated with the application program, wherein the application program is not required to perform synchronization;
   the application program interfaces comprising a first interface and a second interface, wherein:
   the first interface receives a first identifying data segment from the synchronization manager and returns a handle corresponding to the first identifying data segment, the first identifying data segment corresponding to an object in the first object store; and
   the second interface receives the handle corresponding to the first identifying data segment, compares the first identifying data segment with a second identifying data segment corresponding to the object, and in response returns an indication of whether the object has been changed in the first object store.

2. A computer as recited in claim 1, wherein the application programming interfaces comprise an interface that provides an object to the synchronization manager in an application-specific format that is enumerates a list of handles corresponding respectively to objects in the first object store.

3. A computer as recited in claim 1, wherein the application programming interfaces are functional to compare corresponding objects from the first and second object stores based on identifying data segments received from the synchronization manager.

4. A computer system as recited in claim 1, wherein the application programming interfaces comprise an interface that provides an object to the synchronization manager in an application-specific format that is not determined by the synchronization manager; and
   wherein the synchronization manager is functional to pass the object to the second object store in the application-specific format for updating in the second object store.

5. A computer system as recited in claim 1,
   wherein the synchronization manager is functional to receive an object from the second object store in an application-specific format that is not determined by the synchronization manager; and
   the application programming interfaces comprising an interface that receives the object from the synchronization manager in the application-specific format.

6. A computer system as recited in claim 1, wherein the second interface also receives a second handle corresponding to the second identifying data segment.

7. A computer system as recited in claim 1, further comprising:
   a third interface that enumerates a list of handles corresponding respectively to objects in the first object store;
   wherein the second interface also receives a second handle from the list of handles; and
   wherein the second interface compares identifying data segments corresponding to the received handles to determine whether the object has been changed in the first object store.

8. A computer system as recited in claim 1, further comprising a third interface that receives two handles and that returns an indication of whether the two handles correspond to the same object.

9. A computer system as recited in claim 1, further comprising:
   a third interface that receives an object having individual properties and that stores at least some of the individual properties in the first object store; and
   a fourth interface that returns data representing properties of the object that are not supported by the first object store.

10. A computer system as recited in claim 1, further comprising:
    a third interface that receives two handles and that returns an indication of whether the two handles correspond to the same object;

a fourth interface that receives an object having individual properties and that stores at least some of the individual properties in the first object store; and a fifth interface that returns data representing properties of the object that are not supported by the first object store.

11. A method comprising:

submitting a first identifying data segment corresponding to an object in a first object store to a first interface associated with an application program that maintains the first object store;

receiving a handle corresponding to the first identifying data segment from the first interface;

providing the handle corresponding to the first identifying data segment to a second interface associated with the application program, the second interface comparing the first identifying data segment with a second identifying data segment corresponding to the object to determine whether the object has been changed in the first object store; and synchronizing a corresponding object in a second object store with the object in the first object store if the object has been changed in the first object store, wherein the second object store is not associated with the application program.

12. One or more computer-readable media comprising computer-executable instructions that, when executed, direct a computing system to perform the method of claim 11.

13. A method as recited in claim 11, further comprising obtaining the first identifying data segment from a reference store that maintains identifying data segments corresponding respectively to a plurality of objects that are to be synchronized between the first and second object stores.

14. A method as recited in claim 11, further comprising comparing corresponding objects from the first and second object stores based on identifying data segments.

15. A method as recited in claim 11, further comprising providing a second handle to the second interface to compare identifying data segments corresponding to the received handles to determine whether the object has been changed in the first object store.

16. A method as recited in claim 11, further comprising providing two handles to a third interface associated with the application program, the third interface returning an indication of whether the two handles correspond to the same object.

17. A method as recited in claim 11, further comprising receiving the first identifying data segment from an interface associated with the application program, wherein the first identifying data segment contains an object identifier corresponding to the object in the first object store.

18. A method as recited in claim 11, further comprising receiving the first identifying data segment from an interface associated with the application program, wherein the first identifying data segment contains data representing properties that are supported by the second object store but that are not supported by the first object store.

* * * * *

UNITED STATES PATENT AND TRADEMARK OFFICE
CERTIFICATE OF CORRECTION

PATENT NO. : 6,633,924 B1
DATED : October 14, 2003
INVENTOR(S) : Wu et al.

It is certified that error appears in the above-identified patent and that said Letters Patent is hereby corrected as shown below:

Title page,
Item [56], References Cited, U.S. PATENT DOCUMENTS, replace the following "5,493,676 A 2/1996 Amundson" with -- 5,943,676 8/1999 Boothby --.

Column 1,
Line 21, replace "used" with -- use --.

Column 6,
Line 52, delete "is" after "the".

Column 14,
Lines 10 and 16, insert -- system -- between "computer" and "as".
Line 12, delete "provides an object to the synchronization manager in an application-specific format that is" after "that".

Signed and Sealed this

Second Day of March, 2004

JON W. DUDAS
*Acting Director of the United States Patent and Trademark Office*